United States Patent
Hu et al.

(10) Patent No.: US 11,877,147 B2
(45) Date of Patent: Jan. 16, 2024

(54) METHODS, DEVICE AND COMPUTER-READABLE MEDIUM FOR PROTECTING MAC ADDRESSES

(71) Applicant: Nokia Technologies Oy, Espoo (FI)

(72) Inventors: Zhiyuan Hu, Shanghai (CN); Wen Wei, Shanghai (CN); Mingyu Zhao, Shanghai (CN); Yueming Yin, Shanghai (CN); Zhigang Luo, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 48 days.

(21) Appl. No.: 17/255,313

(22) PCT Filed: Jun. 29, 2018

(86) PCT No.: PCT/CN2018/093832
§ 371 (c)(1),
(2) Date: Dec. 22, 2020

(87) PCT Pub. No.: WO2020/000430
PCT Pub. Date: Jan. 2, 2020

(65) Prior Publication Data
US 2021/0266735 A1    Aug. 26, 2021

(51) Int. Cl.
*H04W 12/02* (2009.01)
*H04W 76/10* (2018.01)
(Continued)

(52) U.S. Cl.
CPC ......... *H04W 12/02* (2013.01); *H04L 61/5092* (2022.05); *H04W 12/06* (2013.01);
(Continued)

(58) Field of Classification Search
CPC ..... H04W 12/02; H04W 76/10; H04W 12/06; H04W 12/75; H04W 12/71; H04L 61/5092; H04L 2101/622
See application file for complete search history.

(56) References Cited

U.S. PATENT DOCUMENTS 8,401,024 B2 *  3/2013  Christensen ........ H04L 61/2596
                                                       370/409
2003/0177267 A1 *  9/2003  Orava ................. H04L 63/0407
                                                       709/245
(Continued)

FOREIGN PATENT DOCUMENTS

CN           1739276 A  *  2/2006  ......... H04L 12/2898
CN         101213817 A     7/2008
(Continued)

OTHER PUBLICATIONS

International Search Report and Written Opinion for related International Application No. PCT/CN2018/093832, dated Feb. 28, 2019, 7 pages.

(Continued)

*Primary Examiner* — Matthew C Sams
(74) *Attorney, Agent, or Firm* — DITTHAVONG, STEINER & MLOTKOWSKI

(57) ABSTRACT

Embodiments of the disclosure provide a method, device and computer readable medium for protecting MAC addresses. According to embodiments of the present disclosure, the terminal device may obtain a set of virtual MAC addressed from a network device and may connect with a further network device (for example, Wi-Fi AP or Bluetooth devices) using the virtual MAC addresses. In this way, tracking the terminal device with MAC address is prevented so that user privacy protection could be enhanced.

16 Claims, 5 Drawing Sheets

(51) Int. Cl.
    *H04W 12/06*     (2021.01)
    *H04L 61/5092*     (2022.01)
    *H04W 12/75*     (2021.01)
    *H04W 12/71*     (2021.01)
    *H04L 101/622*     (2022.01)

(52) U.S. Cl.
    CPC ....... *H04W 76/10* (2018.02); *H04L 2101/622* (2022.05); *H04W 12/71* (2021.01); *H04W 12/75* (2021.01)

(56) References Cited

U.S. PATENT DOCUMENTS

| | | | |
|---|---|---|---|
| 2005/0025179 A1 | 2/2005 | McLaggan et al. | |
| 2011/0066756 A1* | 3/2011 | Kakumaru | H04W 8/26 709/245 |
| 2011/0191518 A1 | 8/2011 | Srinivasan | |
| 2012/0163264 A1* | 6/2012 | Chu | H04W 52/0216 370/328 |
| 2013/0262647 A1* | 10/2013 | Kurita | G06F 9/54 709/223 |
| 2014/0025821 A1* | 1/2014 | Baphna | H04L 61/5061 709/226 |
| 2014/0211801 A1* | 7/2014 | Trainin | H04L 61/5046 370/392 |
| 2014/0279862 A1* | 9/2014 | Dietz | H04L 41/0895 707/609 |
| 2015/0163656 A1* | 6/2015 | Son | H04L 61/2521 370/338 |
| 2015/0186174 A1 | 7/2015 | Borkmann et al. | |
| 2016/0050559 A1* | 2/2016 | Rose | H04W 12/02 370/338 |
| 2017/0012935 A1* | 1/2017 | Raman | H04L 63/1458 |
| 2017/0019469 A1 | 1/2017 | Sunay et al. | |
| 2017/0026296 A1 | 1/2017 | Kozat et al. | |
| 2018/0077111 A1* | 3/2018 | Pang | H04L 61/5061 |
| 2018/0077742 A1* | 3/2018 | Pang | H04L 61/5046 |
| 2018/0288612 A1* | 10/2018 | Mathur | H04W 12/02 |
| 2020/0059834 A1* | 2/2020 | Kim | H04W 4/80 |

FOREIGN PATENT DOCUMENTS

| | | | | |
|---|---|---|---|---|
| CN | 102904896 A | * | 1/2013 | |
| WO | WO-2007004921 A1 | * | 1/2007 | ....... H04L 29/12584 |
| WO | WO-2007086705 A1 | * | 8/2007 | ........... H04W 48/08 |
| WO | 2020000430 A1 | | 1/2020 | |

OTHER PUBLICATIONS

Office Action for related European Patent Application No. 18924891.7-1231, dated Dec. 14. 2021, 7 pages.

Communication pursuant to Article 94(3) EPC for related European Patent Application No. 18 924 891.7-1203, dated Oct. 10, 2023, 5 pages.

* cited by examiner

METHODS, DEVICE AND COMPUTER-READABLE MEDIUM FOR PROTECTING MAC ADDRESSES

CROSS-REFERENCES TO RELATED APPLICATIONS

This application claims priority from PCT Application Serial No. PCT/CN2018/093832, entitled "Methods, Device and Computer-Readable Medium for Protecting MAC Addresses," filed on Jun. 29, 2018, the contents of which are hereby incorporated herein in their entirety by this reference.

FIELD

Embodiments of the present disclosure generally relate to communication techniques, and more particularly, to methods, devices and computer readable medium for protecting MAC addresses.

BACKGROUND

Nowadays, terminal devices (for example, smart phone, tablets) can be connected to the internet at anytime and anywhere. The terminal devices may be tracked if the terminal devices are connected to the internet. In particular, if the terminal device is in the mode of cellular radio, the terminal device may be tracked through IMSI (International Mobile Subscriber Identity) of the user or IMEI (International Mobile Equipment Identity) of the terminal device. If the terminal device is in the mode of 802.11 (Wi-Fi) radios, the terminal device may be tracked through MAC (Media Access Control) address of the terminal device. How to protect the terminal device from being tracked is a topic that needs to be further studies.

SUMMARY

Generally, embodiments of the present disclosure relate to a method for protecting MAC addresses and the corresponding network device and terminal device.

In a first aspect, embodiments of the present disclosure provide a communication method. The method comprises: obtaining, at a terminal device, a set of virtual medium access control, MAC, addresses from a first network device. The set of virtual MAC addresses are associated with an original MAC address of the terminal device. The method also comprises in response to a determination that the terminal device is to be connected to a second network device, selecting a target virtual MAC address from the set of virtual MAC addresses. The method further comprises transmitting a connection request to the second network device, the connection request comprising the target virtual MAC address.

In a second aspect, embodiments of the present disclosure provide a communication method. The method comprises receiving, at a network device, a request for a set of virtual medium access control, MAC, addresses from a terminal device. The request comprises information associated with an original MAC address of the terminal device. The information associated with the original MAC address comprises the original MAC address or a currently used virtual MAC address. The method also comprises generating the set of virtual MAC addresses based on the original MAC address. The method further comprises transmitting a response to the terminal device. The response comprises the set of virtual MAC address.

In a third aspect, embodiments of the disclosure provide a terminal device. The terminal device comprises: at least on processor, and a memory coupled to the at least one processor, the memory storing instructions therein, the instructions, when executed by the at least one processor, causing the network device to perform acts including: obtaining, at a terminal device, a set of virtual medium access control, MAC, addresses from a first network device. The set of virtual MAC addresses are associated with an original MAC address of the terminal device. The acts also comprise response to a determination that the terminal device is to be connected to a second network device, selecting a target virtual MAC address from the set of virtual MAC addresses. The acts further comprise transmitting a connection request to the second network device, the connection request comprising the target virtual MAC address.

In a fourth aspect, embodiments of the disclosure provide a network device. The network device comprises: at least on processor; and a memory coupled to the at least one processor, the memory storing instructions therein, the instructions, when executed by the at least one processor, causing the terminal device to perform acts including: receiving a request for a set of virtual medium access control, MAC, addresses from a terminal device. The request comprises information associated with an original MAC address of the terminal device. The information associated with the original MAC address comprises the original MAC address or a currently used virtual MAC address. The acts also comprise generating the set of virtual MAC addresses based on the original MAC address. The acts further comprise transmitting a response to the terminal device. The response comprises the set of virtual MAC address.

In a fifth aspect, embodiments of the disclosure provide an apparatus for communication. The apparatus comprises means for performing the method according to the first aspect.

In a sixth aspect, embodiments of the disclosure provide an apparatus for communication. The apparatus comprises means for performing the method according to the second aspect.

In a seventh aspect, embodiments of the disclosure provide a computer readable medium. The computer readable medium stores instructions thereon, the instructions, when executed by at least one processing unit of a machine, causing the machine to implement the method according to the first aspect.

In an eighth aspect, embodiments of the disclosure provide a computer readable medium. The computer readable medium stores instructions thereon, the instructions, when executed by at least one processing unit of a machine, causing the machine to implement the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
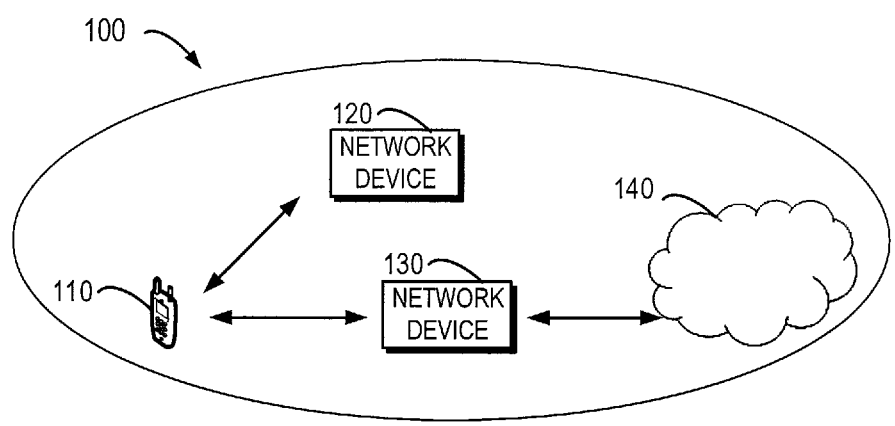
FIG. 1 illustrates a schematic diagram of a communication system according to embodiments of the present disclosure.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to the scenario of vehicle-to-everything (V2X) communications in 5G communication system. It should be noted that embodiments of the present disclosure may be implemented in any suitable scenarios where low latency and/or high reliability are required.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As mentioned above, if a terminal device is connected to a network, the terminal device may be tracked. In particular, if the terminal device is in the mode of 802.11 (Wi-Fi) radios, the terminal device may be tracked through the MAC address.

The term "MAC address" used herein refer to a number used to uniquely identify the terminal device on the local network. Currently, the MAC address of the terminal device is chosen by the terminal device manufacturer at the time the terminal device is created. If the MAC address is not changed regularly, the MAC address uniquely identifies the terminal device. With the MAC address, the movements of the terminal device could be tracked since the MAC address uniquely associates with a terminal device. Thus, the user of the terminal device could be tracked. With some additional information (for example, online flight booking, online hotel reservation), more user privacy information (e.g., user name, phone number, gender, home address) may be probably revealed.

There are two main kinds of methods for someone to get MAC addresses of other users' terminal devices:

The MAC address of the terminal device can be gotten in wireless signals.

Before deciding to connect to a Wi-Fi AP (Access Point), terminal devices are constantly scanning their surroundings for available access points with sending probe request messages. The probe request message includes a MAC address associated with the terminal device. The MAC address included in probe request message is sent out in clear text. So, it can be easily gotten via Wi-Fi radio. Moreover, the terminal device may transmit occasional wireless signals (for example, probe request) that include the MAC address in clear text, whenever Wi-Fi is turned on for a typical terminal device. So, the MAC address can be gotten in wireless signals (for example, probe request) even if a terminal device is not actively connected to a particular Wi-Fi, or even if it is not actively transmitting data.

MAC address of a terminal device can be gotten through Wi-Fi equipment (for example, Wi-Fi AP, Wi-Fi access node, Wi-Fi control system).

When a terminal device connects to a Wi-Fi, the MAC address of this terminal device is logged and stored in Wi-Fi AP or Wi-Fi access node. The users are recognized by their terminal devices when they next connect to this Wi-Fi. For example, public Wi-Fi hotspots are deployed in a shopping mall. Shoppers could be recognized by their terminal devices when they next walk in, or walk into affiliate shop with the same tracing system through the MAC address. This could be used to alert assistants, or to follow people from store to store, and then sell that data to marketers and ad companies. As an example, Transport for London in the UK did the same and used the MAC addresses to study Tube passengers.

In view of the above, leaking original MAC address of a terminal device may raise a serious privacy risk to the individual who owns this terminal device. Thus, it's very important to prevent the MAC address from being revealed.

In conventional technologies, there are some solutions to protect the original MAC address from being revealed, such as using random MAC address, temporary MAC address. However, it seems these solutions have not worked well yet.

For the solution of random MAC address, the original MAC address of a terminal device could be protected from being revealed when the terminal device is not actively connected to a particular Wi-Fi. The original MAC address of a terminal device has to be sent to Wi-Fi AP when the terminal device decides to connect to this Wi-Fi AP. Moreover, it's estimated that only 6% of Android phones randomize MAC addresses in 2017.

For the solution of temporary MAC address, firstly there some changes on WiFi protocols and is not compatible with WiFi AP currently in use on the market. Secondly, this solution does not support hiding unique/original MAC address of a smartphone when it's the first time to connect to a WiFi after it is produced from a factory. Thirdly, a smartphone has to provide its unique/original MAC address to WiFi AP when it's the first time to connect to a WiFi after it is produced from a factory. Forthly, when roaming to another WiFi AP, the smartphone may also have to provide its unique/original MAC address to the target WiFi AP since this solution does not support temporary MAC address confliction. This case is possible: when a smartphone is roaming from source WiFi AP to the target WiFi AP, the temporary MAC address assigned by source WiFi AP may conflict with the temporary MAC address of other smartphone assigned by target WiFi AP. In this case, the smartphone may have to send its unique/original MAC address to the target WiFi AP in order to connect to the WiFi. Fifthly, Wi-Fi APs know the mapping between the original MAC address and the temporary MAC address. But Wi-Fi APs of public Wi-Fi hotspots may be not trusted. The owners of Wi-Fi APs may sell the data on tracking actual users with original MAC address of terminal devices to marketers and ad companies. In a word, the solution of temporary MAC address could not provide privacy protection for users when they access internet using terminal devices through a Wi-Fi.

In conventional technologies, in order to prevent users from being tracked through MAC addresses of terminal devices, both Android and Apple iOS operating systems allow for terminal devices in a disassociated state to use random MAC address only when performing active scans. Therefore, original MAC address of a terminal device may not be revealed when the terminal device is not actively connected to a particular Wi-Fi, or when it is not actively transmitting data.

However, the original MAC address of the terminal device has to be sent to Wi-Fi AP when the terminal device decides to connect to this Wi-Fi AP. Moreover, the solution of random MAC address implemented in both Android and Apple iOS operating systems is to rotate through a sequence of regularly changing pseudo-random addresses when casually probing near-by access points. In a word, the solution of random MAC address could not provide privacy protection for users when they access internet using terminal devices through a Wi-Fi.

Another solution in the conventional technologies is using temporary MAC address. This solution is to use a temporary MAC address (instead of the original MAC address) for data packet transmission between the terminal device and the Wi-Fi AP. The temporary MAC address corresponds to the original MAC address of the terminal device, and is changed regularly. This solution could provide privacy protection for users not only when they access internet using terminal devices through a Wi-Fi, but also when terminal devices are in idle mode (for example, when terminal device are not actively connected to a particular Wi-Fi, or when they are not actively transmitting data). The temporary MAC address is created online by Wi-Fi access node or Wi-Fi AP then sent to a terminal device in the authentication request message Authentication_Req. However, some problems as following could not be solved by this solution:

The above solution brings some changes on Wi-Fi protocols and is not compatible with Wi-Fi AP currently in use on the market.

The above solution does not support hiding the original MAC address of the terminal device when it's the first time to connect to a Wi-Fi after it is produced from a factory. The terminal device has to provide its original MAC address to Wi-Fi AP when it's the first time to connect to a Wi-Fi after it is produced from a factory.

When roaming to another Wi-Fi AP, the terminal device may also have to provide its original MAC address to the target Wi-Fi AP since this solution does not support temporary MAC address confliction. It is possible when a terminal device is roaming from a source Wi-Fi AP to a target Wi-Fi AP, the temporary MAC address assigned by the source Wi-Fi AP may conflict with the temporary MAC address of other terminal devices assigned by target Wi-Fi AP. In this case, the terminal device may have to send its original MAC address to the target Wi-Fi AP in order to connect to the Wi-Fi.

Moreover, many public Wi-Fi hotspots are not secure or trusted. The mapping between temporary MAC addresses and original MAC addresses may be sold by Wi-Fi owners to marketers and ad companies. This raises a privacy risk to individuals.

In order to at least in part solve above and other potential problems, embodiments of the present disclosure provide solutions for protecting MAC addresses.

Now some example embodiments of the present disclosure are described below with reference to the figures. However, those skilled in the art would readily appreciate that the detailed description given herein with respect to these figures is for explanatory purpose as the present disclosure extends beyond theses limited embodiments.

FIG. 1 illustrates a schematic diagram of a communication system in which embodiments of the present disclosure can be implemented. The communication system 100 includes a network device 120, another network device 130 and a terminal device 110. It is to be understood that the communication system 100 may include any suitable number of terminal devices. It should be noted that the communication system 100 may also include other elements which are omitted for the purpose of clarity. The network device 120 may communicate with the terminal device 110. The terminal device 110 may communicate with the network device 130 and access to the network 140 via the network device 130. It is to be understood that the number of network devices and terminal devices shown in FIG. 1 is given for the purpose of illustration without suggesting any limitations. The communication system 100 may include any suitable number of network devices and terminal devices.

Communications in the communication system 100 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

According to embodiments of the present disclosure, the terminal device 110 may obtain a set of virtual MAC addressed from the network device 120 and may connect with the network device 130 (for example, Wi-Fi AP or Bluetooth devices) using the virtual MAC addresses. In this way, tracking the terminal device 110 with MAC address is prevented so that user privacy protection could be enhanced.

Figure 2:
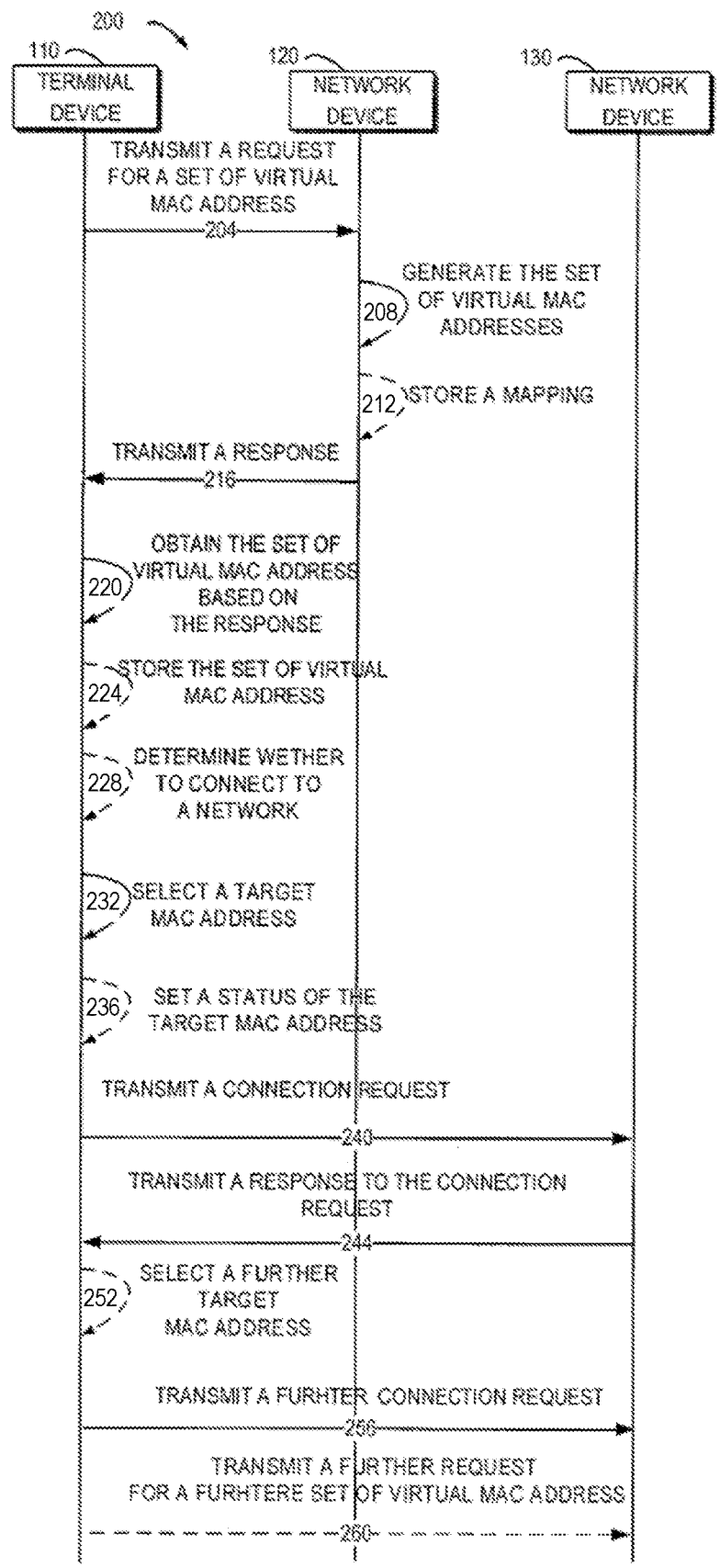
FIG. 2 illustrates a schematic diagram of interactions between the terminal device and the network devices according to embodiments of the present disclosure.

FIG. 2 illustrates a schematic diagram of interactions 200 among the terminal device 110, the network device 120 and the network device 130 according to embodiments of the present disclosure. In some embodiments, the network device 120 may support distributed deployment.

The terminal device 110 transmits 204 a request for a set of virtual MAC addresses to the network device 120. The terminal device 110 may transmit the request via different communication modes. For example, the terminal device may transmit the request through wireline access. Alternatively or in addition, the terminal device may transmit the request using cellular communications. The request may also be transmitted via Wi-Fi communications. It is noted that the request may be transmitted in any suitable communications.

The terminal device 110 may transmit the request regularly. For example, the terminal device 110 may transmit the request once a week. Alternatively or in addition, the terminal device 110 may transmit the request based on triggering conditions. The triggering conditions may include first registration of the terminal device 110 and/or reserved virtual addresses being removed by some incidents and/or virtual addresses being used up.

In some embodiments, prior transmitting the request for the set of virtual MAC addresses, the terminal device 110 and the network device 120 may perform authentication with each other. For example, the authentication between the terminal device 110 and the network device 120 may be based on their certificates (i.e., public keys). These certificates with their corresponding private keys are preconfigured by the manufacture. If the authentication is successful, a session key "SK" may be obtained and used to encrypt the subsequent data transmission.

The request for the virtual MAC addresses may include the original MAC address of the terminal device 110. Alternatively or in addition, if the terminal device is configured with an initial virtual MAC address by the manufacture, the request may comprise the initial virtual MAC address. The request may be encrypted using the session key. The initial virtual MAC address of the terminal device 110 may be used to connect to a Wi-Fi according to IEEE standard 802.11. Thus, there is no change to Wi-Fi protocol to establish IEEE 802.11 association.

The network device 120 may obtain the original MAC address of the terminal device 110 from the request. In some embodiments, the network device 120 may decrypt the request based on the session key.

The network device 120 generates 208 the set of virtual MAC addresses for the terminal device 110. The number of virtual MAC addresses may be predetermined by the network device 120. In an example embodiment, the network device 120 may generate the set of virtual MAC addresses randomly. Alternatively or in addition, the network device 120 may assign temporary virtual MAC addresses. In other embodiments, the network device 120 may recycle anonymous MAC addresses. In some embodiments, the network device 120 may store 212 the mapping between the original MAC address of the terminal device 110 and the set of virtual addresses. The mapping may be stored locally or in a remote storage device.

In some embodiments, the network device 120 may be managed by a trusted third party and can only be accessed by authorized users. In this way, the original MAC addresses of the terminal device 110 can be protected from being revealed through Wi-Fi AP.

The network device 120 transmits 216 a response to the request for the set of virtual MAC addresses. The response comprises the set of virtual MAC addresses. In some embodiments, if the terminal device 110 and the network device 120 are authenticated, the response may be encrypted by the session key.

The terminal device 110 obtains 220 the set of virtual MAC addresses based on the response. For example, the terminal device 110 may decrypt the response to obtain the set of virtual MAC addresses using the session key.

The terminal device 110 may store 224 the set of virtual MAC addresses in local storage. The terminal device may also store the set of virtual MAC addressees in a remote storage which can be accessed. The terminal device 110 may also set the initial status of the set of virtual MAC addresses as unused.

In some embodiments, the terminal device 110 may choose a virtual MAC address from the set of virtual MAC addresses to be used in the message "probe request" for scanning the network device 130. The terminal device 110 may also use the initial virtual MAC address for scanning.

The terminal device 110 may determine 228 whether to connect to the network device 130. If the terminal device 110 determines to connect to the network device 130, the terminal device 110 select 232 a target virtual address from the set of virtual MAC addresses. In some embodiments, the target virtual MAC address may be the same as the virtual address for scanning the network device 130. In other embodiments, the terminal device 110 select a virtual MAC address which is not used previously as the target virtual MAC address. The terminal device 110 may set 236 the status of the target virtual MAC address as used.

The terminal device 110 transmits 240 a connection request to the network device 130. The connection request comprises the target virtual MAC address. In some embodiments, the terminal device 110 and the network device 130 may perform authentication with each other using the target virtual MAC address.

The network device 130 transmits 244 a response to the connection request. If the response indicates that the connection request is accepted, the terminal device 110 may communicate with the network device 130 to access to the network 140.

If the response indicates a failure, the terminal device 110 may determine the reason that caused the failure. If the terminal device 110 determines that there is a MAC address confliction in the network device 130, the terminal device may select 252 a further target virtual MAC address and transmit 256 a further connection request to the network device 130. The further connection request comprises the further target virtual MAC address. In an example embodiment, the further target virtual address may be selected from the unused virtual MAC addresses in the set of virtual MAC addresses. If all of the virtual MAC addresses are used, the terminal device 110 may select a used virtual MAC address as the further target virtual MAC address.

The terminal device 110 may transmit 260 a further request for a further set of virtual MAC addresses to the network device 120. For example, if all of the virtual MAC addresses in the current set of virtual MAC addresses are used, the terminal device 110 may request for the further set of virtual MAC addresses. In other embodiments, as discussed above, the terminal device 110 may update the virtual addresses regularly. The terminal device 110 may also update the virtual addresses based on triggering conditions. The triggering conditions may include first registration of the terminal device 110 and/or reserved virtual MAC addresses being removed by some incidents or virtual MAC addresses being used up.

If the terminal device 110 determines to connect to a different network device, the terminal device 110 may use a virtual MAC address that is different from the one used for connecting the network device 130. In this way, the terminal device 110 cannot be tracked through the MAC addresses.

Figure 3:
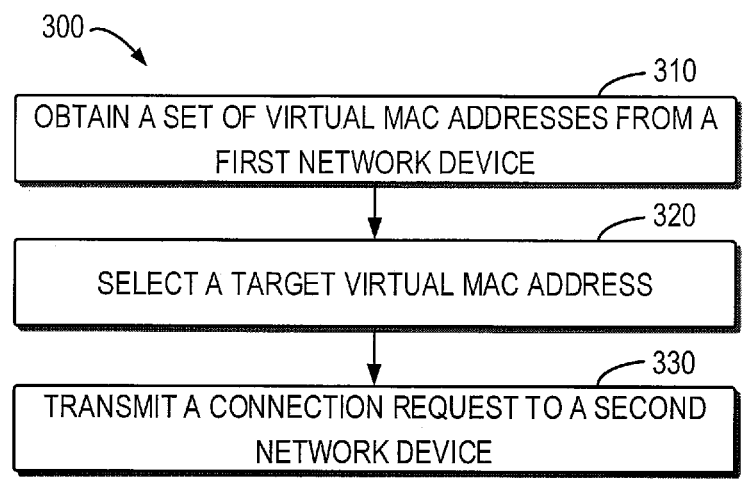
FIG. 3 illustrates a flow chart of a method implemented at a terminal device according to embodiments of the present disclosure.

FIG. 3 illustrates a flow chart of a method 300 according to embodiments of the present disclosure. The method 400 may be implemented at the terminal device 110.

At block 310, the terminal device 110 may obtain a set of virtual MAC addresses from the network device 120. The set of virtual MAC addresses are associated with the original MAC address of the terminal device 110.

In some embodiments, the terminal device 110 may transmit a request to the network device 120 for the set of virtual MAC addresses. In some embodiments, the request comprises an original MAC address For example, for the first registration request (that is to say, when the terminal device 110 is the first time to connect the network device 120 after it is shipped from the factory), the request comprises the original MAC addresses. Alternatively or in addition, the request may comprise a currently used virtual MAC address of the terminal device 110. The terminal device 110 may receive the response to the request and obtain the set of virtual MAC addresses based on the response. The terminal device 110 may also store the set of virtual MAC addresses.

In some embodiments, the terminal device 110 may perform an authentication with the network device 120 and transmit the request for the set of virtual MAC addresses if authentication is successful.

At block 320, the terminal device 110 select the target virtual MAC address from the set of virtual MAC address in response to a determination that the terminal device is to be connected to the network device 130.

In some embodiments, the terminal device 110 may select a virtual MAC address that is unused previously as the target MAC addresses and set the status of the target virtual MAC address as used.

At block 330, the terminal device 110 transmits a connection request to the network device 130. The connection request comprises the target virtual MAC address. In some embodiments, the terminal device 110 may receive a response to the connection request from the network device 130. The terminal device may select a further target virtual MAC address from the set of virtual MAC addresses if the response indicates a conflication of MAC address in the network device 130. The terminal device may transmit a further connection request to the network device 130. The further connection may comprise the further target virtual MAC address.

In some embodiments, if the each of the set of virtual addresses is used, the terminal device 110 may transmit a further request for virtual addressed to the network device 110 to obtain a further set of virtual MAC addresses.

Figure 4:
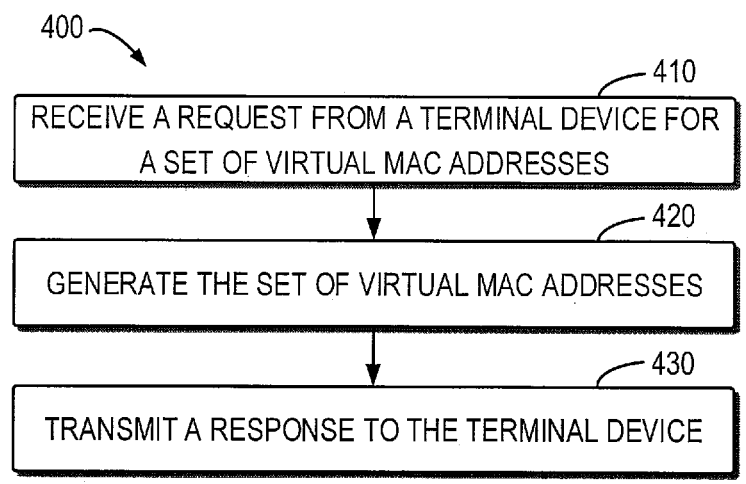
FIG. 4 illustrates a flow chart of a method implemented at a network device according to embodiments of the present disclosure.

FIG. 4 illustrates a flow chart of a method 400 according to embodiments of the present disclosure. The method 400 may be implemented at the network device 120.

At block 410, the network device 120 receives a request from the terminal device for the set of virtual MAC addresses. The request comprises information associated with an original address of the terminal device 110. The request comprises an original MAC address or a currently used virtual MAC address of the terminal device 110. For the first registration request (that is to say, when the terminal device 110 is the first time to connect the network device 120 after it is shipped from the factory), the request comprises the original MAC address of the terminal device 110. In an example embodiment, the network device 120 may determine the original MAC address of the terminal device 110 based on the currently used the virtual MAC address. For example, the network device 120 may store the mapping between the original MAC address and the virtual MAC address. By way of example, if the network device 120 receives the currently used virtual MAC address, the network device 120 may look up the original MAC address based on the mapping.

In some embodiments, the network device 120 may perform the authentication with the terminal device 110 and receive the request for the virtual addresses from the terminal device 110 if the authentication is successful.

At block 420, the network device 120 generates the set of virtual MAC addresses based on the original MAC address. In an example embodiment, the network device 120 may generate the set of virtual MAC addresses randomly. Alternatively or in addition, the network device 120 may assign temporary virtual MAC addresses. In other embodiments, the network device 120 may recycle anonymous MAC addresses. In some embodiments, the network device 130 may store the mapping between the original MAC address and the set of virtual MAC addresses.

At block 430, the network device 120 transmits the response to the terminal device. The response comprises the set of virtual MAC addresses.

In some embodiments, an apparatus for performing the method 300 (for example, the terminal device 110) may comprise respective means for performing the corresponding steps in the method 300. These means may be implemented in any suitable manners. For example, it can be implemented by circuitry or software modules.

In some embodiment, the apparatus comprises: means for obtaining, at a terminal device, a set of virtual medium access control, MAC, addresses from a first network device, the set of virtual MAC addresses associated with an original MAC address of the terminal device; means for in response to a determination that the terminal device is to be connected to a second network device selecting a target virtual MAC address from the set of virtual MAC addresses; and means for transmitting a connection request to the second network device, the connection request comprising the target virtual MAC address.

In some embodiment, the means for obtaining the set of virtual MAC addresses comprises: means for transmitting a request for the set of virtual MAC addresses to the first network device, the request comprising the original MAC address; means for receiving a response to the quest; means for obtaining the set of virtual MAC addresses based on the response; and means for storing the set of virtual MAC addresses.

In some embodiments, the means for obtaining the set of virtual MAC addresses comprises: means for transmitting a request for the set of virtual MAC addresses to the first network device, the request comprising a currently used virtual MAC address associated with the original MAC address; means for receiving a response to the quest; means for obtaining the set of virtual MAC addresses based on the response; and means for storing the set of virtual MAC addresses.

In some embodiment, the means for transmitting the request for the set of virtual MAC addresses to the first network device comprise: means for performing an authentication with the first network device; means for in response to the authentication being successful, transmitting the request to the first network device.

In some embodiment, the means for selecting the target virtual MAC address comprises: means for selecting, from the set of virtual MAC addresses, a virtual MAC address that is unused previously as the target virtual MAC address; and means for setting a status of the target virtual MAC address as used.

In some embodiment, the apparatus further comprises: means for receiving a response to the connection request from the second network device; means for in response to the response indicating a confliction of MAC address in the second network device selecting a further target virtual MAC address from the set of virtual MAC addresses; and means for transmitting a further connection request to the second network device, the connection request comprising the further target virtual MAC address.

In some embodiment, the apparatus further comprises: means for in response to each of the set of virtual address being used transmitting a further request for a further set of virtual MAC addresses to the first network device.

In some embodiments, an apparatus for performing the method 400 (for example, the network device 120) may comprise respective means for performing the corresponding steps in the method 400. These means may be implemented in any suitable manners. For example, it can be implemented by circuitry or software modules.

In some embodiment, the apparatus comprises: means for receiving, at a network device, a request for a set of virtual medium access control, MAC, addresses from a terminal device, the request comprising information associated with an original address of the terminal device, the information comprising the original address or a currently used virtual MAC address; means for generating the set of virtual MAC addresses based on the original MAC address; and means for transmitting a response to the terminal device, the response comprising the set of virtual MAC address.

In some embodiments, the means for generating the set of virtual MAC addresses comprises: means for in response to the information comprising the currently used virtual MAC address, determining the original MAC address based on the currently used virtual MAC address.

In some embodiment, the means for receiving the request for the set of virtual MAC addresses comprises: means for performing, at the first network device, an authentication with the terminal device; means for in response to the authentication being successful receiving the request for the set of virtual MAC addresses from the terminal device.

In some embodiment, the apparatus further comprises: means for storing a mapping between the original MAC address and the set of virtual MAC addresses.

Figure 5:
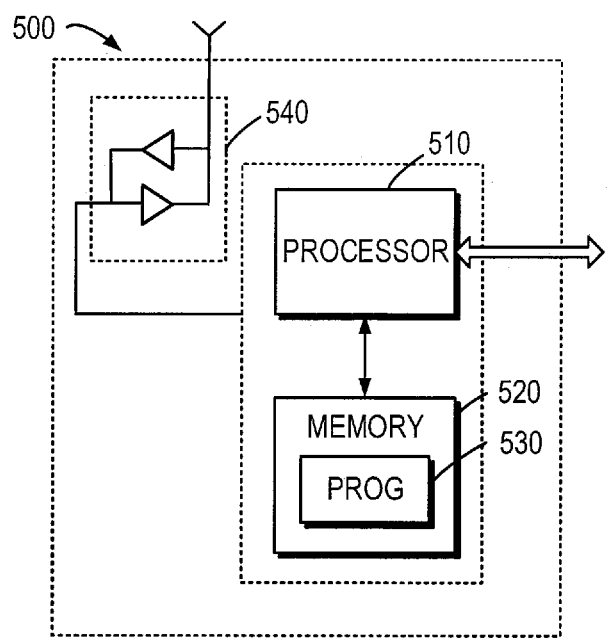
FIG. 5 illustrates a schematic diagram of a device according to embodiments of the present disclosure.

FIG. 5 is a simplified block diagram of a device 600 that is suitable for implementing embodiments of the present disclosure. The device 500 may be implemented at the network device 120. The device 500 may also be implemented at the terminal device 110. As shown, the device 500 includes one or more processors 510, one or more memories 520 coupled to the processor(s) 610, one or more transmitters and/or receivers (TX/RX) 540 coupled to the processor 510.

The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 520 stores at least a part of a program 530. The TX/RX 540 is for bidirectional communications. The TX/RX 540 has at least one antenna to facilitate communication, though in practice an Access Node mentioned in this application may have several ones. The communication interface may represent any interface that is necessary for communication with other network elements.

The program 530 is assumed to include program instructions that, when executed by the associated processor 510, enable the device 500 to operate in accordance with the embodiments of the present disclosure, as discussed herein with reference to FIGS. 2-4. That is, embodiments of the present disclosure can be implemented by computer software executable by the processor 510 of the device 500, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A terminal device, comprising:
   at least one processor; and
   at least one memory coupled to the at least one processor, the at least one memory storing instructions that when executed by the at least one processor, cause the terminal device to perform acts comprising:
   obtain a set of virtual medium access control, MAC, addresses from a first network device, the set of the virtual MAC addresses associated with an original MAC address of the terminal device, wherein a request is generated for the set of the virtual MAC addresses, the request comprising a currently used virtual MAC address associated with the original MAC address;
   in response to a determination that the terminal device is to be connected to a second network device, select a target virtual MAC address from the set of the virtual MAC addresses; and
   transmit a connection request to the second network device, the connection request comprising the target virtual MAC address.

2. The terminal device of claim 1, wherein obtaining of the set of the virtual MAC addresses further comprises:
   transmit a request for the set of the virtual MAC addresses to the first network device, the request comprising the original MAC address;
   receive a response to the request;
   obtain the set of virtual MAC addresses based on the response; and
   store the set of virtual MAC addresses.

3. The terminal device of claim 1, wherein obtaining of the set of the virtual MAC addresses further comprises:
   transmit the request for the set of the virtual MAC addresses to the first network device;
   receive a response to the request;
   obtain the set of the virtual MAC addresses based on the response; and
   store the set of virtual MAC addresses.

4. The terminal device of claim 2, wherein transmitting of the request for the set of virtual MAC addresses to the first network device further comprise:
   perform an authentication with the first network device;
   in response to the authentication being successful, transmit the request to the first network device.

5. The terminal device of claim 3, wherein transmitting of the request for the set of the virtual MAC addresses to the first network device further comprise:
   perform an authentication with the first network device;
   in response to the authentication being successful, transmit the request to the first network device.

6. The terminal device of claim 1, wherein selecting of the target virtual MAC address further comprises:
   select, from the set of virtual MAC addresses, a virtual MAC address that is unused previously as the target virtual MAC address; and
   set a status of the target virtual MAC address as used.

7. The terminal device of claim 1, wherein the acts further comprise:
   receive a response to the connection request from the second network device;
   in response to the response indicating a confliction of MAC address in the second network device, select a further target virtual MAC address from the set of virtual MAC addresses; and
   transmit a further connection request to the second network device, the connection request comprising the further target virtual MAC address.

8. A terminal device of claim 1, wherein the acts further comprise:
   in response to each of the set of the virtual addresses being used, transmit a further request for a further set of virtual MAC addresses to the first network device.

9. A communication method, comprising:
   obtaining, at a terminal device, a set of virtual medium access control, MAC, addresses from a first network device, the set of the virtual MAC addresses associated with an original MAC address of the terminal device, wherein a request is generated for the set of the virtual MAC addresses, the request comprising a currently used virtual MAC address associated with the original MAC address;

in response to a determination that the terminal device is to be connected to a second network device, selecting a target virtual MAC address from the set of the virtual MAC addresses; and transmitting a connection request to the second network device, the connection request comprising the target virtual MAC address.

10. The method of claim 9, wherein obtaining the set of virtual MAC addresses further comprises:
    transmitting a request for the set of the virtual MAC addresses to the first network device, the request comprising the original MAC address;
    receiving a response to the request;
    obtaining the set of the virtual MAC addresses based on the response; and
    storing the set of the virtual MAC addresses.

11. The method of claim 9, wherein obtaining the set of the virtual MAC addresses further comprise:
    transmitting the request for the set of the virtual MAC addresses to the first network device;
    receiving a response to the request;
    obtaining the set of the virtual MAC addresses based on the response; and
    storing the set of the virtual MAC addresses.

12. The method of claim 10, wherein transmitting the request for the set of virtual MAC address to the first network device further comprise:
    performing an authentication with the first network device;
    in response to the authentication being successful, transmitting the request to the first network device.

13. The method of claim 11, wherein transmitting the request for the set of the virtual MAC addresses to the first network device further comprise:
    performing an authentication with the first network device;
    in response to the authentication being successful, transmitting the request to the first network device.

14. The method of claim 9, wherein selecting the target virtual MAC address further comprise:
    selecting, from the set of the virtual MAC addresses, a virtual MAC address that is unused previously as the target virtual MAC address; and
    setting a status of the target virtual MAC address as used.

15. The method of claim 9, further comprising:
    receiving a response to the connection request from the second network device;
    in the response indicating a confliction of MAC address in the second network device, selecting a further target virtual MAC address from the set of the virtual MAC addresses; and
    transmitting a further connection request to the second network device, the connection request comprising the further target virtual MAC address.

16. The method of claim 9, further comprising:
    in response to each of the set of virtual address being used, transmitting a further request for a further set of virtual MAC addresses to the first network device.

* * * * *